US006837788B2

(12) United States Patent
Cannon

(10) Patent No.: US 6,837,788 B2
(45) Date of Patent: Jan. 4, 2005

(54) METHOD OF PLAYING A DUAL WAGERING GAME

(75) Inventor: Lee E. Cannon, Bozeman, MT (US)

(73) Assignee: IGT, Reno, NV (US)

( * ) Notice: Subject to any disclaimer, the term of this patent is extended or adjusted under 35 U.S.C. 154(b) by 90 days.

(21) Appl. No.: 09/939,001

(22) Filed: Aug. 24, 2001

(65) Prior Publication Data

US 2002/0025845 A1 Feb. 28, 2002

(51) Int. Cl.[7] .................................................. A63F 13/00
(52) U.S. Cl. ......................... 463/16; 463/20; 273/138.2
(58) Field of Search ............................... 463/16–22, 25; 273/138.1, 138.2, 139, 143 R

(56) References Cited

U.S. PATENT DOCUMENTS

| | | | | |
|---|---|---|---|---|
| 4,805,907 | A | 2/1989 | Hagiwara | 273/138 A |
| 4,961,578 | A | 10/1990 | Chateau | 273/144 R |
| 4,998,199 | A | 3/1991 | Tashiro et al. | 364/410 |
| 5,112,050 | A | 5/1992 | Koza et al. | |
| 5,116,049 | A | 5/1992 | Sludikoff et al. | |
| 5,186,463 | A | 2/1993 | Marin et al. | |
| 5,232,221 | A | 8/1993 | Sludikoff et al. | |
| 5,259,616 | A | 11/1993 | Bergmann | 273/138 A |
| 5,273,281 | A | 12/1993 | Lovell | |
| 5,332,219 | A | 7/1994 | Marnell, II et al. | 273/138 A |
| 5,342,049 | A | 8/1994 | Wichinsky et al. | 273/119 R |
| 5,380,007 | A | 1/1995 | Travis et al. | |
| 5,393,057 | A | 2/1995 | Marnell, II | |
| 5,401,024 | A | 3/1995 | Simunek | |
| 5,451,052 | A | 9/1995 | Behm et al. | |
| 5,456,465 | A | 10/1995 | Durham | 273/138 A |
| 5,486,005 | A | 1/1996 | Neal | 273/292 |
| 5,513,846 | A | 5/1996 | Niederlein et al. | 273/143 R |
| 5,540,442 | A | 7/1996 | Orselli et al. | 463/17 |
| 5,564,700 | A | 10/1996 | Celona | |

(List continued on next page.)

FOREIGN PATENT DOCUMENTS

| | | |
|---|---|---|
| AU | 18428/92 | 12/1992 |
| AU | 21070/92 | 10/1993 |

(List continued on next page.)

OTHER PUBLICATIONS

Oregon Lottery, How to Play Megabucks, May 8, 2001.
Oregon Lottery, How to Play Megabucks, Mar. 9, 2001.
Internation Search Report for PCT/US02/26358.
Website entitled, "Oregon Lottery Megabucks—How to play," last updated on May 24, 2001, located at http://www.oregonlottery.org/mega/m howto.htm.

*Primary Examiner*—Jessica Harrison
*Assistant Examiner*—Aaron Capron
(74) *Attorney, Agent, or Firm*—Marshall, Gerstein & Borun LLP

(57) ABSTRACT

A dual wagering game method for one or more players based on simultaneous participation in two mutually exclusive game components with a payoff being the product of the game component outcomes. Wagers are made in both a repeatable base game component and a nonrepeatable bonus game component which components are mutually exclusive. The outcome of the bonus game component results in a multiplier value. Winnings from repeated plays of the base game component are accumulated until a game ending event occurs and the player receives a payout of any accumulated winnings from the base game component multiplied by the multiplier value determined in the bonus game component.

18 Claims, 8 Drawing Sheets

U.S. PATENT DOCUMENTS

| | | | | |
|---|---|---|---|---|
| 5,655,961 | A | 8/1997 | Acres et al. | 463/27 |
| 5,722,891 | A | 3/1998 | Inoue | 463/20 |
| 5,732,948 | A | 3/1998 | Yoseloff | 273/274 |
| 5,741,183 | A | 4/1998 | Acres et al. | 463/42 |
| 5,743,800 | A | 4/1998 | Huard et al. | 463/26 |
| 5,752,882 | A | 5/1998 | Acres et al. | 463/42 |
| 5,770,533 | A | 6/1998 | Franchi | |
| 5,772,509 | A | 6/1998 | Weiss | |
| RE35,864 | E | 7/1998 | Weingardt | |
| 5,797,794 | A | 8/1998 | Angell | 463/18 |
| 5,820,459 | A | 10/1998 | Acres et al. | 463/25 |
| 5,823,874 | A | 10/1998 | Adams | 463/17 |
| 5,830,063 | A | 11/1998 | Byrne | |
| 5,833,537 | A | 11/1998 | Barrie | |
| 5,836,817 | A | 11/1998 | Acres et al. | 463/26 |
| 5,848,932 | A | 12/1998 | Adams | 463/20 |
| 5,876,284 | A | 3/1999 | Acres et al. | 463/25 |
| 5,882,261 | A | 3/1999 | Adams | 463/20 |
| 5,911,418 | A | 6/1999 | Adams | 273/274 |
| 5,996,997 | A | 12/1999 | Kamille | |
| 6,004,207 | A | 12/1999 | Wilson, Jr. et al. | 463/20 |
| 6,012,982 | A | 1/2000 | Piechowiak et al. | 463/16 |
| 6,077,162 | A | 6/2000 | Weiss | |
| 6,089,978 | A | 7/2000 | Adams | 463/20 |
| 6,142,872 | A | 11/2000 | Walker et al. | |
| 6,149,521 | A | 11/2000 | Sanduski | 463/13 |
| 6,179,710 | B1 | 1/2001 | Sawyer et al. | |
| 6,217,448 | B1 | 4/2001 | Olsen | |
| 6,227,969 | B1 | 5/2001 | Yoseloff | |
| 6,238,288 | B1 | 5/2001 | Walker et al. | 463/26 |
| 6,309,300 | B1 | 10/2001 | Glavich | 463/26 |
| 6,334,814 | B1 | 1/2002 | Adams | 463/20 |
| 6,340,158 | B2 | 1/2002 | Pierce et al. | 273/138.1 |
| 6,375,568 | B1 | 4/2002 | Roffman et al. | 463/26 |
| 6,416,408 | B2 | 7/2002 | Tracy et al. | 463/16 |
| 6,419,579 | B1 | 7/2002 | Bennett | 463/20 |
| 6,648,753 | B1 | 11/2003 | Tracy et al. | 463/16 |
| 6,692,354 | B2 | 2/2004 | Tracy et al. | 463/16 |

FOREIGN PATENT DOCUMENTS

| | | | |
|---|---|---|---|
| AU | 52499/96 | | 2/1997 |
| AU | 199716432 | B2 | 9/1997 |
| AU | 50327/96 | | 10/1997 |
| AU | 45403/97 | | 6/1998 |
| AU | 63553/98 | | 10/1998 |
| DE | 30 35 898 | A1 | 4/1982 |
| DE | 30 35 947 | A1 | 5/1982 |
| DE | 29 38 307 | C2 | 6/1982 |
| DE | 34 15 114 | A1 | 10/1985 |
| DE | 29 38 307 | C3 | 7/1987 |
| DE | 38 22 636 | A1 | 1/1990 |
| DE | 197 06 286 | A1 | 5/1998 |
| DE | 298 03 107 | U1 | 9/1998 |
| DE | 298 16 453 | U1 | 4/1999 |
| DE | 197 51 746 | A1 | 5/1999 |
| EP | 0 798 676 | A1 | 10/1997 |
| EP | 0 874 337 | A1 | 10/1998 |
| EP | 0 896 304 | A2 | 2/1999 |
| EP | 0 919 965 | A2 | 6/1999 |
| ES | 529535 | | 6/1983 |
| ES | 529536 | | 6/1983 |
| ES | 2 006 400 | | 4/1989 |
| ES | 2 006 401 | | 4/1999 |
| GB | 2 230 373 | A | 10/1990 |
| GB | 2 222 712 | B | 6/1992 |
| GB | 2 295 775 | A | 6/1996 |
| GB | 2 328 311 | A | 2/1999 |
| WO | WO 91/17529 | | 11/1991 |
| WO | WO 98/40138 | | 9/1998 |
| WO | WO 00/00256 | | 1/2000 |
| WO | WO 00/78418 | | 12/2000 |

METHOD OF PLAYING A DUAL WAGERING GAME

BACKGROUND OF THE INVENTION

This invention relates generally to casino-type wagering games. More specifically, this invention relates to dual wagering game for heightened interest through group participation in which players participant in two mutually exclusive game components with a payoff being the product of the outcomes of the game components.

Slot machines have long been a significant facet of the gaming industry. Video versions of slot machines are now widespread. For the most part, however, slot machine wagering has been somewhat solitary in nature, as is lottery wagering. It is thought that the popularity of solitary wagering activities, like slot machine play, can be enhanced for both new and experienced players alike by incorporating some of the dynamics of group participation to generate a collective excitement as might be found at a casino craps or blackjack table.

In the past, various attempts have been proposed to include group participation aspects to the wagering environment. Illustrative of such efforts are U.S. Pat. No. 5,830,063 to Byrne; U.S. Pat. No. 5,393,057 to Marnell, II; U.S. Pat. No. 5,112,050 to Koza et al.; U.S. Pat. No. 5,772,509 to Weiss; and U.S. Pat. No. 5,833,537 to Barrie.

Byrne '063 discloses a "collateral gambling game" which is a group game to be played in association with an individual principal game. Specifically, Byrne discloses a collateral group game, generally referred to as "Super Keno", in which players may make an additional wager on the outcome of an individual or "standard keno" game played by any one of a number of different players. Byrne does not require that both games be played. If any player playing the standard keno game wins their individual game, during the game in which the Super Keno entries are valid, any player who placed a wager in the Super Keno game also wins. Winnings for the Super Keno game are distributed from a different jackpot pool than the standard Keno winnings.

Marnell, II '057 discloses an electronic gaming apparatus and method involving an electronic individual gaming device and an electronic group gaming device electrically coupled to one another. The individual gaming device is responsive to the occurrence of selected events for input into the group gaming device. Thus, play and selection in the group game is dependent upon the occurrence of specified events in one or more of a number of individual games. As such, the results of the primary game (individual gaming device) enable the play of the secondary game (group gaming device).

Koza et al. '050 discloses a broadcast lottery game in which winning information is broadcast over a medium and received by a game ticket. A player acquires a ticket for a given game. Resident within or on the ticket is a stored value, e.g., a number. At some stage of the game, a winning value is designated. This winning value is broadcast over a medium, such as by radio frequency transmission. Each ticket includes a receiver for receiving the broadcast message containing the winning value and each ticket has the ability to determine whether the stored value that has been assigned to that ticket is entitled to win a prize. If appropriate, the ticket gives sensory information to the player, informing the player that he or she is a winner in the game.

Weiss '509 discloses an instrumentality and method directed to an interactive gaming system in which a plurality of first gaming machines are in operative communication with a second gaming machine. The outcome from the plurality of first gaming machines may allow one or more players at these machines to participate in a further opportunity to be awarded a prize on the second gaming machine. Once an individual player qualifies to play on the second gaming machine, an opportunity of winning on the second machine exists according to a series of outcomes determined by a random number generator.

Barrie '537 discloses a gaming apparatus and method in which players are motivated to play multiple rounds of play by the presence of an indicator or symbol which persists between successive rounds of play and, preferably, can affect the reward for a winning game outcome. In other words, Barrie discloses a gaming apparatus and method in which not all reward-affecting symbols (e.g., cards, in keno or blackjack, or symbols on a slot machine) change from one round of play to the next. In one embodiment, Barrie discloses a slot machine wherein each potential winning line displays a multiplier which is permanently affixed to the machine and does not vary with play. If a winning outcome is achieved in a winning line for which there is affixed a multiplier symbol, the player's winnings will be multiplied by the numerical value assigned the multiplier symbol.

With respect to gaming features actually in use, a game being offered by the Oregon Lottery entitled Megabucks is a lottery game based on six (6) randomly drawn numbers. The specific game details can be found at the website located at www.oregonlottery.org. Winnings are determined by the participant's lottery ticket matches of the randomly drawn numbers determining play for the group of participants. This lottery offers a "Kicker" option whereby, if played, the winnings in the Megabucks game are multiplied by four (4) if four or five matches are achieved, or a simple fixed payoff is made from the Kicker game if only three matches are achieved. Accordingly, the multiplier feature is only available if a certain outcome is achieved and the multiplier itself is fixed in value.

None of the foregoing approaches appear to successfully capture the psychologic essence of a wagering group pitted collectively together against the casino or gaming house. The need remains in the gaming industry for a wagering game to heighten interest in solitary-type wagering activities, such a slot machine play, by incorporating features of group participation for added excitement.

SUMMARY OF THE INVENTION

According to an aspect of the present invention, a dual wagering game method is provided, the method including recognizing a game terminating event, making a first wager on an outcome of a first game component, and recognizing an initial value zero for an outcome accumulator value of a second game component. The method also includes making a first wager on an outcome of said second game component, determining the outcome of said second game component, the determination of the outcome of the second game component being independent of the outcome of the first game component, determining the value of the outcome of said second game component, and adding the value of the outcome of said second game component to said outcome accumulator value of said second game component. The method further includes determining the outcome of said first game component, the determination of the outcome of the first game component being independent of the outcome of the second game component, determining the value of the outcome of said first game component, and realizing a payoff equal to said value to the outcome of said first game component multiplied by said outcome accumulator value of said second game component upon occurrence of said game terminating event.

According to another aspect of the present invention, a dual wagering game method is provided, the method including establishing a game terminating event, permitting each of one or more game participants to place a first wager on an outcome of a first game component common to all game participants, and storing an initial value zero for an outcome accumulator value of a second game component for each game participant, said second game component being unique to each game participant. The method also includes permitting each game participant to place a first wager on an outcome of said second game component, determining a value to the outcome of said second game component for each participant, the determination of the outcome of the second game component being independent of the outcome of the first game component, and summing the value of the outcome of said second game component to said outcome accumulator value of said second game component for each participant. The method further includes determining a value to the outcome of said first game component, the determination of the outcome of the first game component being independent of the outcomes of the second game components for each participant, and paying a payoff to each game participant equal to said value to the outcome of said first game component multiplied by said outcome accumulator value of said second game component of each game participant upon occurrence of said game terminating event.

BRIEF DESCRIPTION OF THE DRAWINGS

In the following description of the drawings, in which like reference numerals are employed to indicate like parts in the various views.

DETAILED DESCRIPTION OF THE INVENTION

Figure 1:
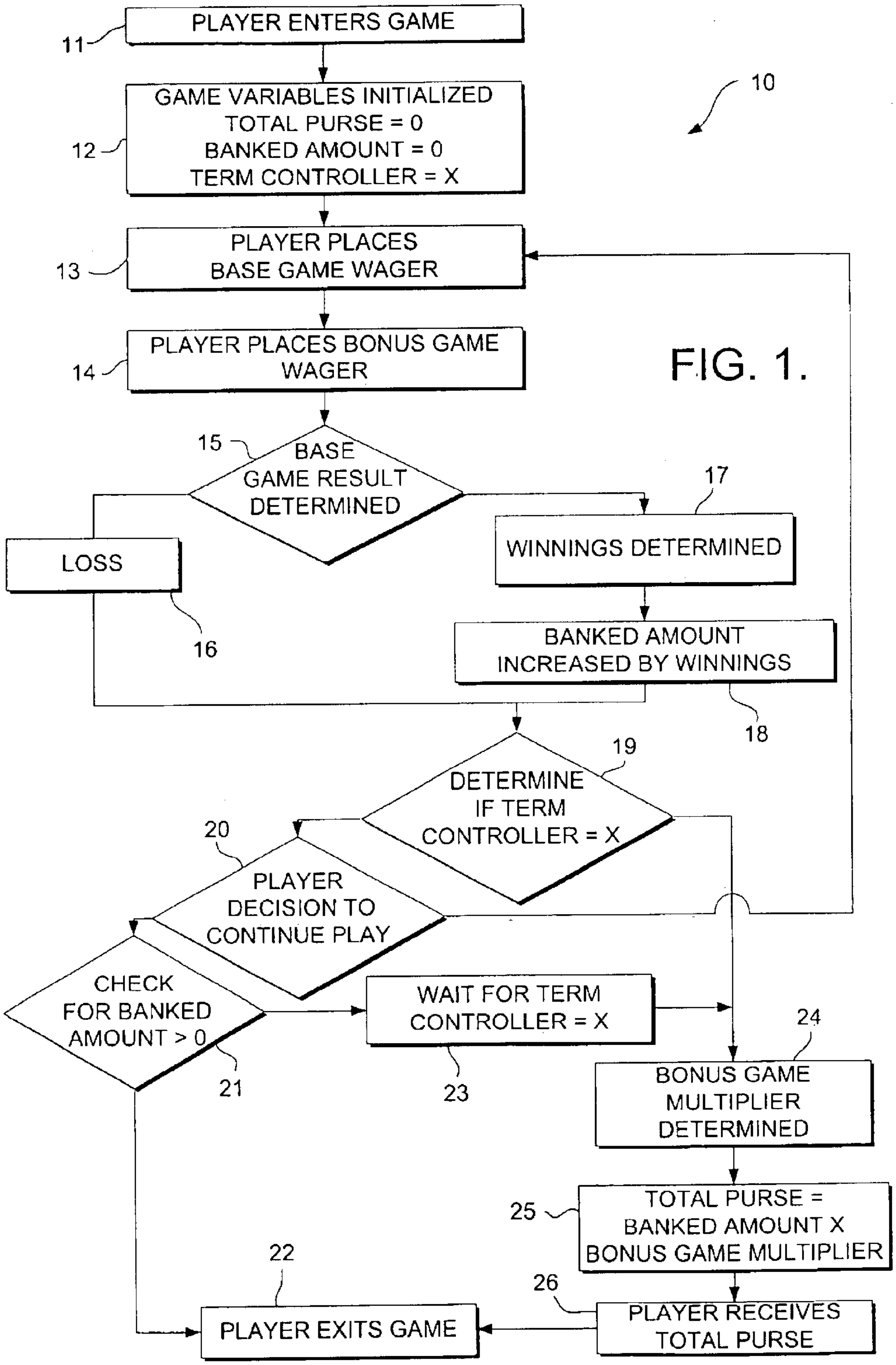
FIG. 1 is a flow diagram of a dual wagering game method from the standpoint of a participant in accordance with one embodiment of the invention wherein the bonus game multiplier is determined at the conclusion of play of the base game and a bonus game wager is required for each repetition of the base game.

One embodiment of a dual wagering game 10 of this invention is illustrated in FIG. 1. For ease of understanding, the flow diagram is constructed largely from the standpoint of a participant or player of the game. Those skilled in the gaming arts, however, will readily understand that a bankrolling entity, such as a casino, lottery manager, game supervisor or the like, will typically be in charge of the supervision, management, conduct and payoff of the game. For ease of reference and without limitation, such entity is referenced in this description as the casino.

After any appropriate screening measures by the casino, such as identification, proof of age, credit worthiness, or the like, the participant may be admitted as indicated by the numeral 11 to participate in the dual wagering game 10. It should be noted that participation may occur at a specified single location, such as a casino or gaming house, at one or more satellite remote locations, or at any type of virtual location as may be established through a myriad of telecommunication and computer linkages, as known in the relevant art.

At the outset of the dual wagering game 10, certain game variables will be initialized or set as indicated by the numeral 12. These include the participant's "Total Purse" received at the conclusion of one complete playing of the game 10; the participant's "Banked Amount" accumulated during repetitious play of a base game component; a "Term Controller" set to control and determine the end of the game 10; and, in some variations of the game, a "Bonus Multiplier" set to exclude a player's participation in the bonus game. Accordingly, at the game outset, the Total Purse and Banked Amount values for the participant are set to zero since nothing has yet been won in either the bonus game or base game components.

The value of the Term Controller is set by the casino, as illustrated by the value "X" in the drawings, in order to fix an ending of the dual wagering game 10. Virtually any event occurrence may be used to signal an end to the game 10. The ending event may be known or unknown to the participant. When the ending event is known in advance, therefore, anticipation and excitement in play of the base game may mount as the dual wagering game draws near to a close. Likewise, a "surprise," unexpected or unknown ending during repetitious play of the base game may be more desirable and exciting for some participants. Without limitation, some examples of ending events for the dual wagering game 10 include a preselected or randomly generated time interval, a preselected or randomly generated number of completions of the base game component, or any occurrence of a preselected independent event known to occur after commencement of said dual wagering game.

As an alternative to the occurrence of a game ending event, variations may be incorporated in the dual wagering game 10 to permit a participant to cash out or exit at the player's election.

After the game variables are initialized and stored for recall as at step 12, the participant commences play at 13 by placing a wager on a base game. Virtually any wagering activity may form the basis of the base game. The only requirements are that the base game be conducive to repetitious play and that each replay of the base game result in an independent outcome. In other words, one outcome of play of the base game does not influence the outcome of subsequent plays. Without limitation, some examples of wagering games suitable as the base game component of the dual wagering game 10 include various games of chance utilizing gaming equipment such as dice, cards, random number generators for games such as Keno, Bingo and lotteries, wheels, revolving reels, gaming machines, coin flips, races, athletic events and other such events having independent outcomes. As a most preferred embodiment, the base game comprises a slot machine.

Either before or after placing a wager on the base game, as at 13, or simultaneous therewith, the participant also places a wager on a bonus multiplier game as indicated by the numeral 14. Depending upon the casino rules, the amount of the participant's wager on the base game may or may not influence or determine the amount of the participant's wager on the bonus game component. For example, a matching requirement may be implemented such that a $1 bet on the base game may result in a $1 bet on the bonus game.

After the participant places wagers in both the base and bonus game components, the base game progresses and an outcome is achieved as indicated by the numeral 15. For example, activity 15 might represent one play of a slot machine. If an unfavorable outcome results, as at 16, then no winnings are achieved. If the outcome of the base game component is favorable, however, then the amount of winnings are determined as at 17. Rather than being immediately paid out as might be the case in a conventional casino game, the amount of winnings are combined with the previous value of the "Banked Amount" and stored as a new "Banked Amount" at step 18.

At the conclusion of play of the base game component, a check is performed to determine if the game terminating event has yet occurred as indicated by the numeral 19. If the game 10 is still ongoing, then the participant decides, as at 20, whether or not to make a subsequent play (i.e., a replay) of the base game component. If the decision is to continue play, then the participant repeats the process of placing a base game wager 13, placing a bonus game wager 14 and a won/loss outcome 15 is determined. The amount of any additional winnings are added to previously winnings to increase the value of the "Banked Amount."

If play of the game 10 is ongoing, but the participant's decision is to discontinue play at process step 20, then a check is made of the player's "Banked Amount" as at 21. If the value of the "Banked Amount" is zero, then the outcome of the multiplier game component will not affect the player who may figuratively exit the game 10 as indicated by the numeral 22. If, on the other hand, the participant has a balance value for "Banked Amount" greater than zero as a result of accumulated winnings from playing the base game component, the player may simply wait, at indicated by process step 23, for occurrence of the game ending event.

Once the condition is met which signals an end of the game 10 (i.e., the "Term Controller"=X), then the bonus game component occurs and the bonus multiplier is determined as indicated at process step 24. Virtually any chance activity independent of the base game may form the basis of the bonus game component. Without limitation, some examples of wagering games suitable as the base game component of the dual wagering game 10 include various games of chance utilizing gaming equipment such as dice, cards, random number generators for games such as Keno, Bingo and lotteries, wheels, revolving reels, gaming machines, coin flips, races, athletic events and other such events having independent outcomes. As a most preferred embodiment, and the easiest manner of conceptualizing the basic idea, the bonus game comprises a rotatable wheel having various numbered positions of which one will be the outcome of the bonus game. Any numbered position on the wheel may represent the selected multiplier value itself, or may represent a selection which must be translated to a multiplier value. As an additional example of the latter principle, the bonus game may be configured as a roll of dice or the cut of a card deck, where the value of the bonus multiplier is determined from the outcome of the dice roll or card selection. An ace may result in a multiplier value of 5, many face card being a multiplier of 2, and any other card being a multiplier of 1, as an arbitrary example.

Further, and with respect to the multiplier values appropriate for use in the dual wagering game 10, it is contemplated that greater interest by gaming participants will exist if the possible multiplier values utilized range upwardly from one (1). Conceptually, however, the multiplier values could also include the range of zero (0) to one (1), even though such outcomes would result in a reduction of the payoff total when applied to the accumulated winnings that the participant achieves during play of the base game component. Nevertheless, higher incentives may be built into the game 10 so that participants may be willing to accept the added risk associated with multiplier possibilities between zero and one.

Once the multiplier value is determined 24, then the participant's "Total Purse" is computed at process step 25 to be the product of the value of the player's "Banked Amount" and the multiplier value. The participant then receives as payout at step 26 the "Total Purse" so determined in the previous computation and finally exits the game 10 figuratively at step 22.

Figure 2:
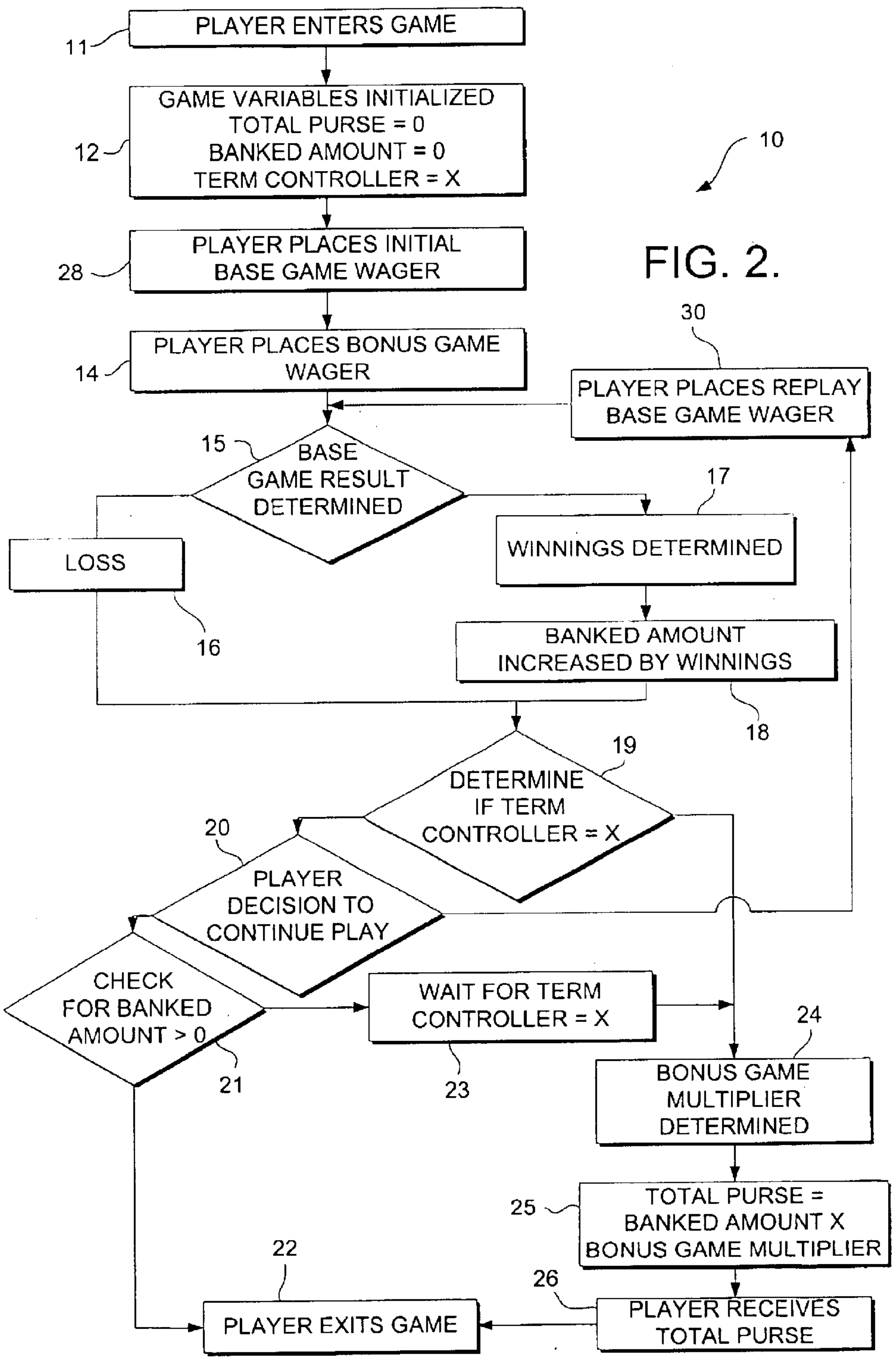
FIG. 2 is a flow diagram of a dual wagering game method from the standpoint of a participant in accordance with a second embodiment of the invention wherein the bonus game multiplier is determined at the conclusion of play of the base game and only a single bonus game wager is required.

FIG. 2 illustrates a second embodiment of the dual wagering game. Like the dual wagering game illustrated in FIG. 1, the FIG. 2 dual wagering game 10 provides for a bonus game multiplier component which is determined at step 24 at conclusion of play of the base game. In other words, when the game ending event occurs as schematically represented at process step 19, the bonus multiplier for the group of player participants will be determined.

However, unlike the dual wagering game illustrated in FIG. 1, the FIG. 2 dual wagering game 10 provides for a single initial wager 28 on the bonus game which provides the player participation in the bonus game at the occurrence of the game ending event 19 even after repetitious play of the base game. Replays of the base game are commenced when the player places a subsequent base game wager as illustrated at process step 30. The remaining features of the dual wager game 10 of FIG. 2 are substantially similar to those previously described with reference to FIG. 1.

Under the conditions of play as shown in FIG. 2, the casino will most likely impose additional rules governing the relationship between the amounts of the wagers to be placed on the base and bonus game components. For example, it is anticipated that the wager on the bonus game at step 14 will most likely be required to be larger than the base game wagers at steps 28 or 30. Accordingly, the amounts of the base and bonus game wagers might be fixed, in the same or different amounts, for the entire play of the dual wagering game 10. Alternatively, the base game wagers might be limited to a percentage of the bonus game wager as determined by the casino rules.

Figure 3:
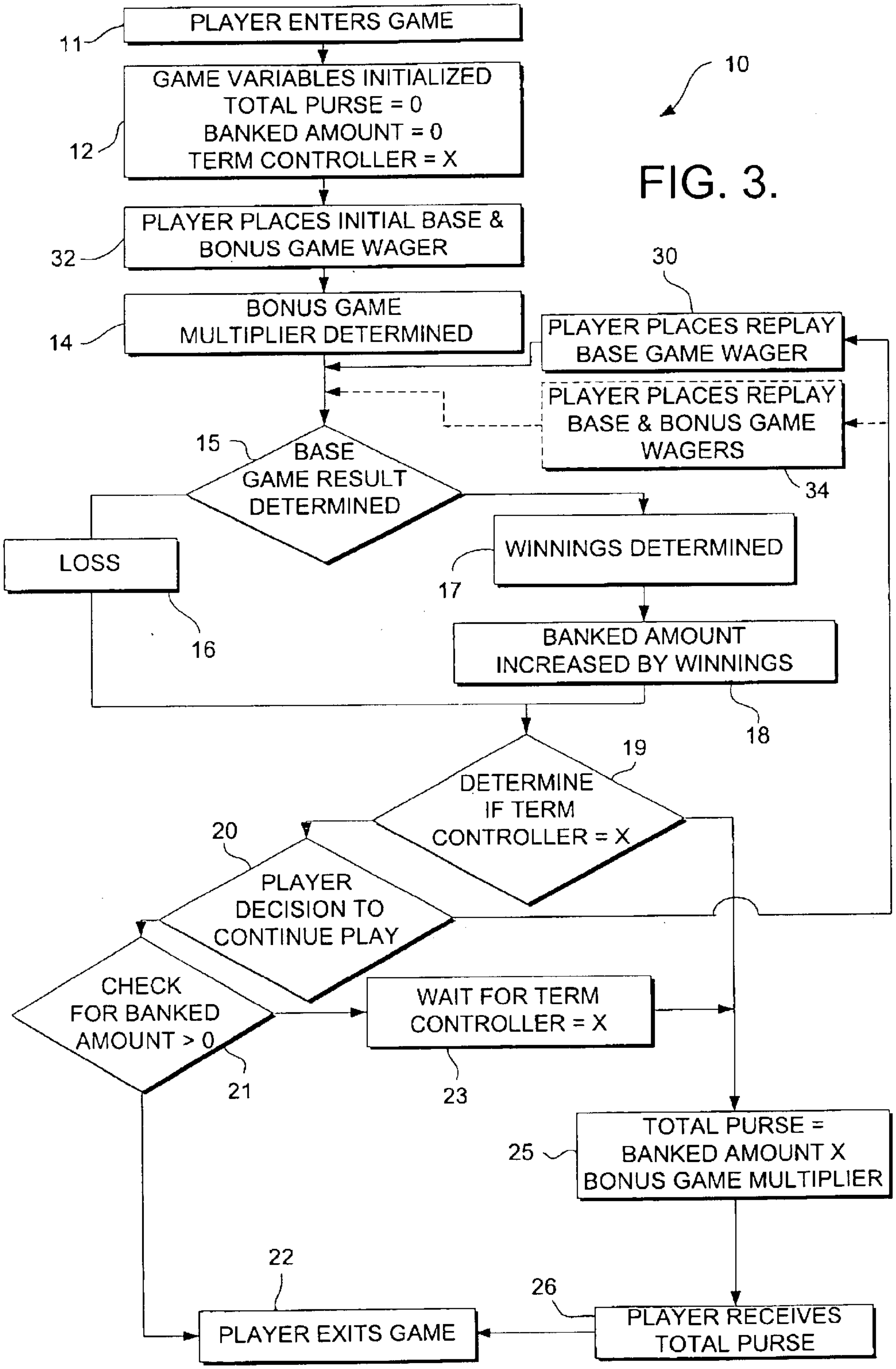
FIG. 3 is a flow diagram of a dual wagering game method from the standpoint of a participant in accordance with a third embodiment of the invention wherein the bonus game multiplier is determined prior to commencement of play of the base game.

FIG. 3 illustrates a third embodiment of the dual wagering game. A player literally or figuratively enters the game 10 at the first step 11 and the game variables are initialized at 12 as previously described. At the next step 32, the player places initial base and bonus game wagers for the privilege of participating in both components of the game 10. The order and amounts of the wagers at step 32 may be subject to additional casino rules. Thereafter, the bonus game multiplier is determined at process step 24 before play of the base game commences at 15. The casino may choose to disclose the value of the bonus multiplier to the group of participating players or the value of the multiplier may be undisclosed to the group. Depending upon whether or not the value of the multiplier is known to the group of players, their individual strategies to playing the base game may be influenced.

Replays of the base game are commenced when the player places a subsequent base game wager as illustrated at process step 30. Optionally, as illustrated at step 34, are play in the base game may also require placing an additional wager on the bonus game component in order to remain qualified to have accumulated winnings in the base game multiplied by the bonus at the conclusion of the game 10. The remaining features of the dual wager game 10 of FIG. 3 are substantially similar to those previously described.

Figure 4A:
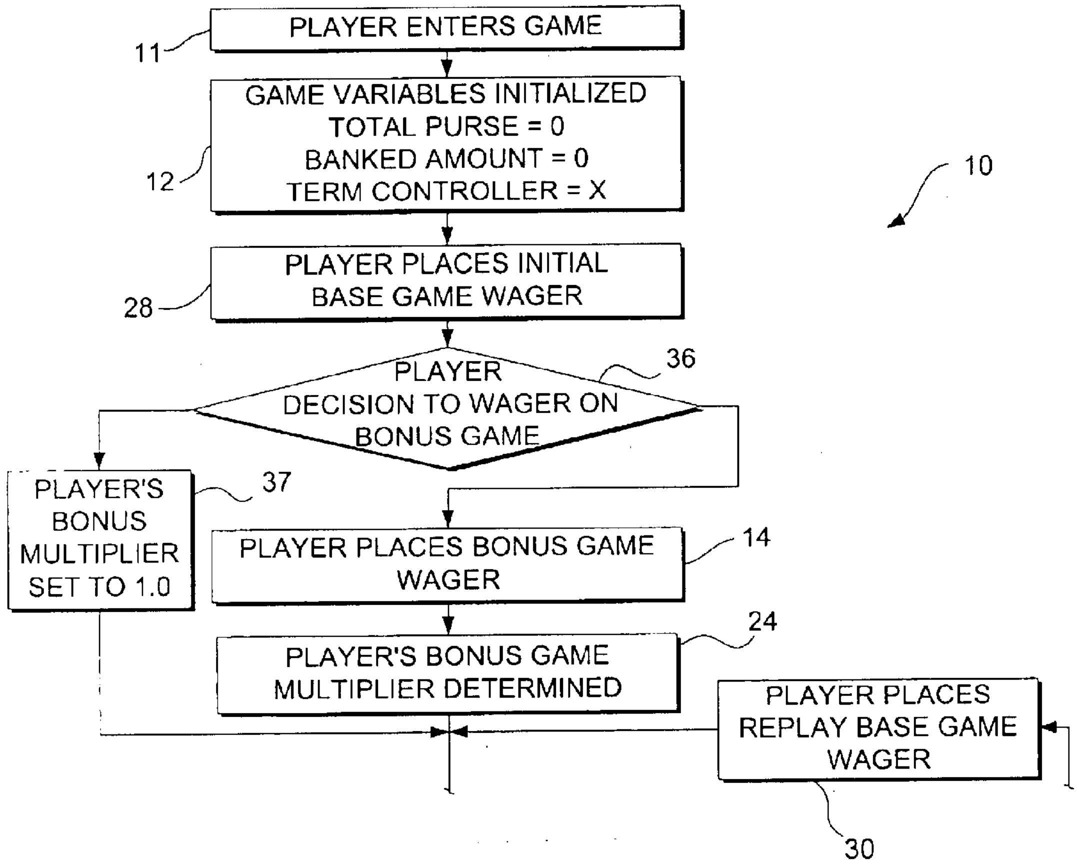
FIG. 4 is a flow diagram of a dual wagering game method from the standpoint of a participant in accordance with a fourth embodiment of the invention wherein the participant may opt out of the bonus game and receives a multiplier value of 1.0 for the duration of the game.
Figure 4B:
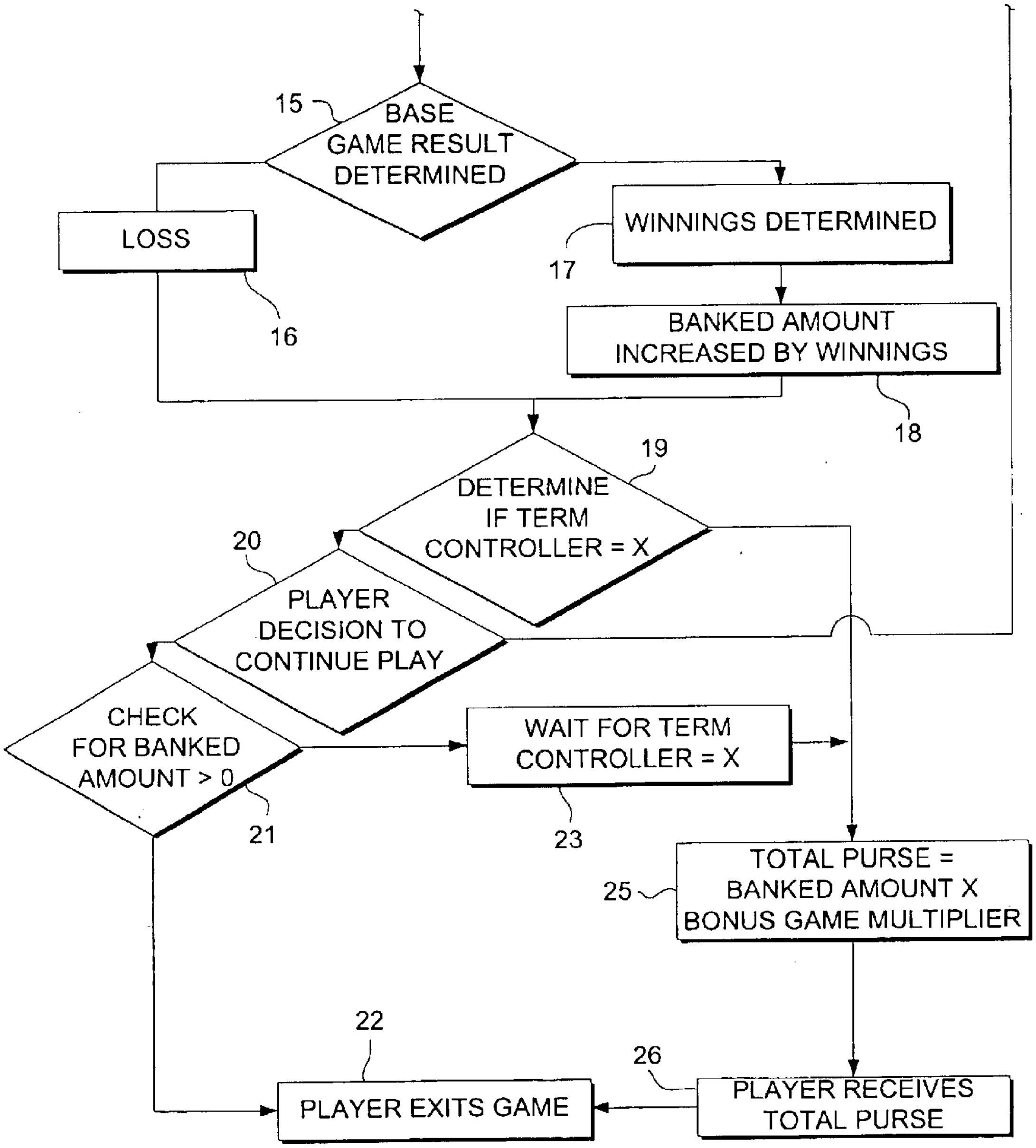

FIG. 4 illustrates a fourth embodiment of the dual wagering game to illustrate how an individual player might opt out of the group participation in the bonus game component. A player literally or figuratively enters the game 10 at the first step 11, the game variables are initialized at 12, and the player makes an initial wager 28 on the base game as previously described. Next, the player decides whether or not to participate in the bonus game. If the player elects not to wager on the bonus game, then the player's bonus multiplier value is set to 1.0 for the remainder of the game 10 as illustrated at step 37. If, on the other hand, the player decides to participate in the bonus game, a bonus wager is placed at step 14 and play continues. The value of the bonus game multiplier may next be determined at step 24 as illustrated in FIG. 4 or determination of the bonus game multiplier may be delayed until the game ends as described with reference to FIGS. 1 & 2. In either variation, however, those players participating in the group bonus game will have their accumulated base game winnings multiplied by the bonus value for an increased "Total Purse" and those players not participating in the group bonus game will simply collect their accumulated base game winnings since the bonus multiplier applied in their individual cases will be 1.0 and will not result in an increased "Total Purse" for them.

Replays of the base game are commenced when the player places a subsequent base game wager as illustrated at process step 30 as previously described. Both players participating in the group bonus game and those not participating in the group bonus game are thus permitted to continue play in the base game component until the game ending event occurs at step 19.

Figure 5A:
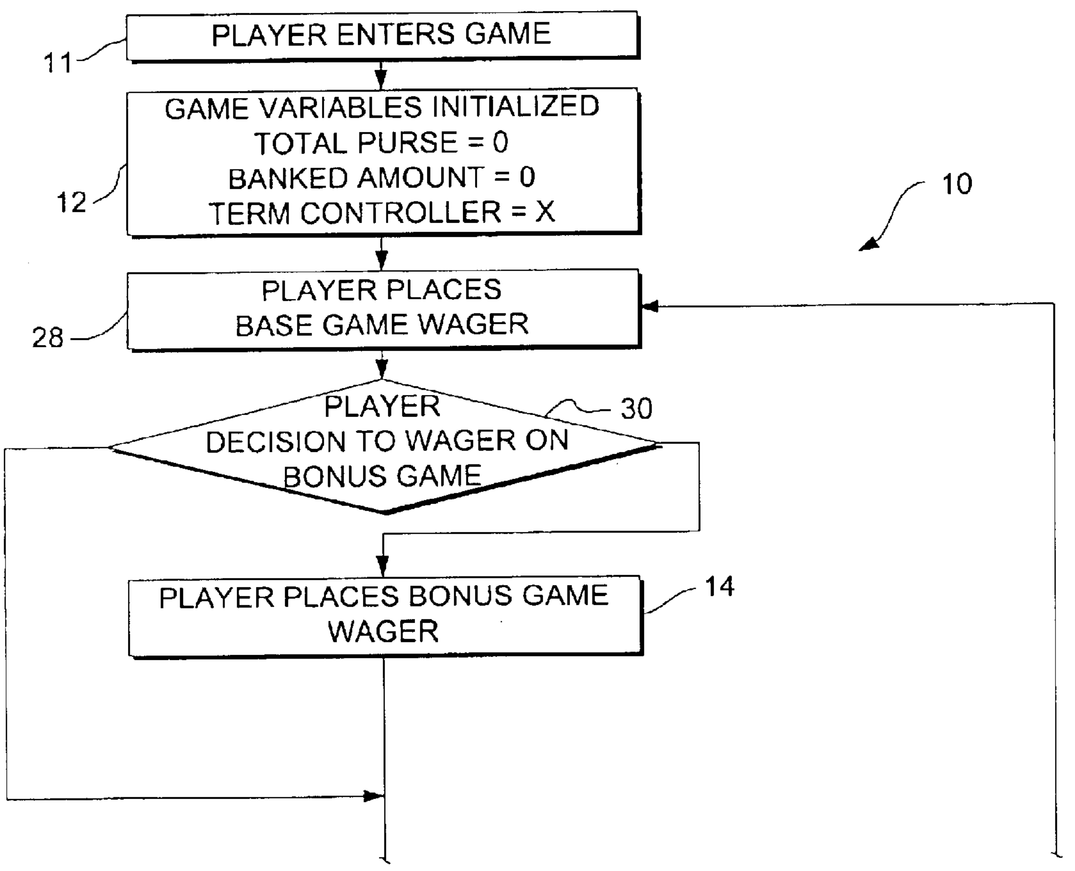
FIG. 5 is a flow diagram of a dual wagering game method from the standpoint of a participant in accordance with a fifth embodiment of the invention wherein the bonus game multiplier is determined at the conclusion of play of the base game and a bonus game wager is optional for each repetition of the base game and wherein the participant may cash out before determination of the bonus game multiplier and have a default multiplier applied to any accumulated winnings of the base game.
Figure 5B:
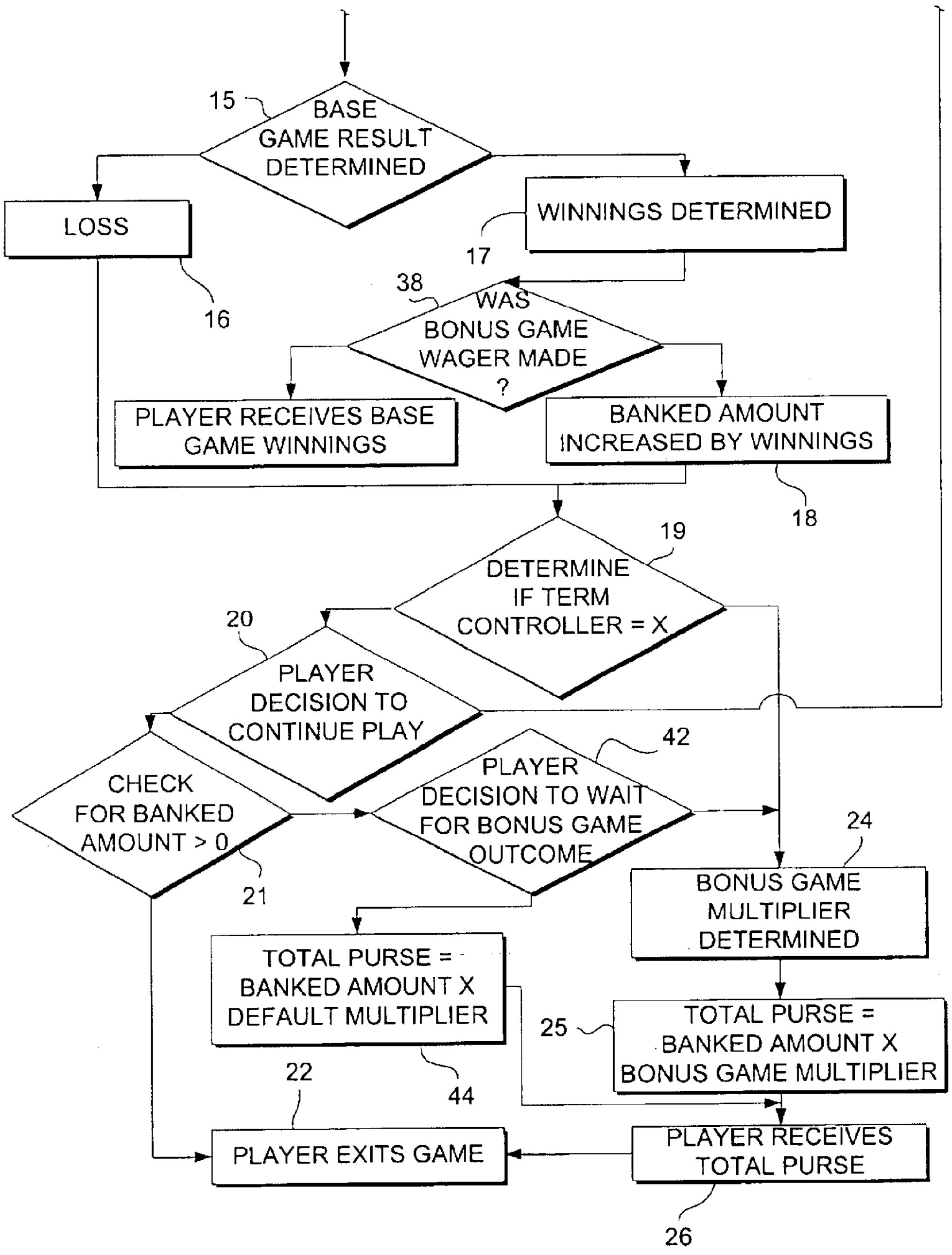

FIG. 5 illustrates a fifth embodiment of the dual wagering game to illustrate how an individual player might opt out of the bonus game component on successive replays of the base game component. FIG. 5 also illustrates a variation to permit a participant to "cash out" or exit at the player's election before occurrence of the game ending event when the bonus game multiplier is determined.

A player literally or figuratively enters the game 10 at the first step 11, the game variables are initialized at 12, and the player makes an initial wager 28 on the base game as previously described. Next, the player decides at 36 whether or not to participate in the bonus game. If the player elects not to wager on the bonus game, then play simply continues with the base game result determined at step 15. If, on the other hand, the player decides to participate in the bonus game, a bonus wager is placed at step 14 before play continues at step 15. If an unfavorable outcome results, as at 16, then no winnings are achieved. If the outcome of the base game component is favorable, however, then the amount of winnings are determined as at 17. After step 17, a determination is made at 38 whether or not the participant wagered on the bonus game. If so, the amount of winnings are combined with the previous value of the "Banked Amount" and stored as a new "Banked Amount" at step 18. If, however, the participant did not wager on the bonus game for the particular iteration of the base game, then the winnings determined at 17 are simply paid out at step 40.

At the conclusion of play of the base game component, a check is performed to determine if the game terminating event has yet occurred as indicated by the numeral 19. If the game 10 is still ongoing, then the participant decides, as at 20, whether or not to make a subsequent play (i.e., a replay) of the base game component. If the decision is to continue play, then the participant repeats the process of placing a base game wager 28 and determining at 36 whether or not to wager on the bonus game for the specific base game iteration to be played.

If play of the game 10 is ongoing, but the participant's decision is to discontinue play at process step 20, then a check is made of the player's "Banked Amount" as at 21. If the value of the "Banked Amount" is zero, then the outcome of the multiplier game component will not affect the player who may figuratively exit the game 10 as indicated by the numeral 22. If, on the other hand, the participant has a balance value for "Banked Amount" greater than zero as a result of accumulated winnings from playing the base game component, then the player decides at step 42 whether or not to simply await the occurrence of the game ending event.

Assuming the player has a positive Banked Amount and elects to await the game ending event, then once the condition is satisfied which signals an end of the game 10 (i.e., the "Term Controller"=X), then the bonus game component occurs and the bonus multiplier is determined as indicated at process step 24. As previously mentioned, virtually any chance activity independent of the base game may form the basis of the bonus game component. When the bonus game multiplier value is determined at 24, then the participant's "Total Purse" is computed at process step 25 to be the product of the value of the player's "Banked Amount" and the bonus game multiplier value.

Alternatively, assuming the player has a positive Banked Amount but elects not to await the game ending event, then the casino may fix a predetermined Default Multiplier by which the participant's "Total Purse" is computed at process step 44 to be the product of the value of the player's "Banked Amount" and the Default Multiplier so as to permit the player alternative exit from the game 10.

Accordingly, the participant then receives as payout at step 26 the "Total Purse" so determined by one of the two previous computations and finally exits the game 10 figuratively at step 22.

From the foregoing description of the dual wagering game 10 from the standpoint of a game participant, those skilled in the gaming arts will readily understand the additional equipment and procedures to be implemented from the standpoint of the casino or game operator in order to conduct the dual wagering game 10. For example, software and computer processing equipment may be necessary for the initialization, storage, retrieval and manipulation of data for each of the players in any group participating in the game 10 at one time. Likewise, additional equipment and procedures may be required in association with the game terminating event to signal the end of each play of the dual wagering game 10.

Figure 6:
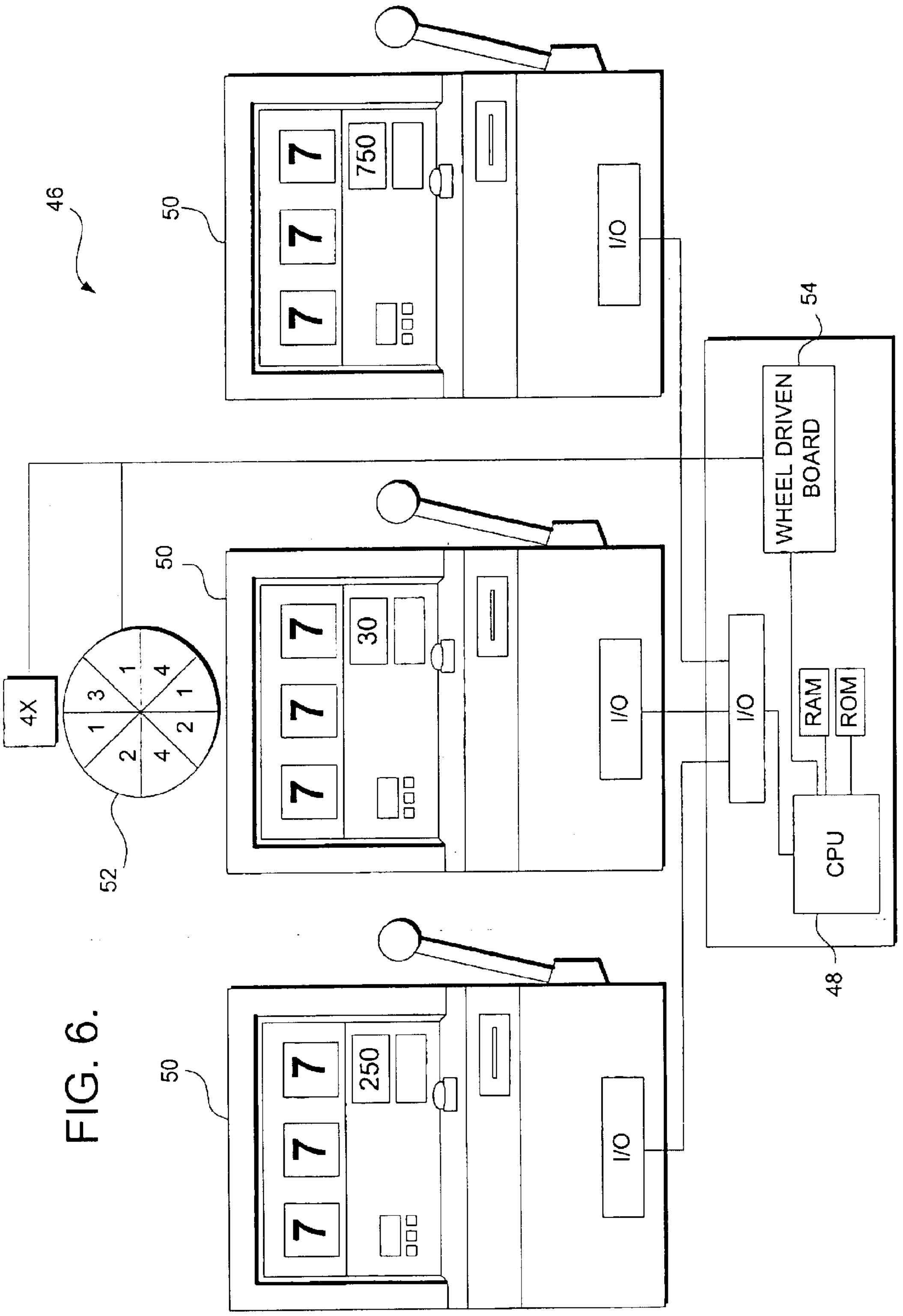
FIG. 6 is a schematic diagram of a representative apparatus system adapted for playing a dual wagering game in accordance with the invention.

FIG. 6 schematically illustrates an apparatus system for playing a dual wagering game in accordance with the foregoing methods and variations with the invention. The system 46 includes one or more (preferably a plurality) gaming machines 50 that are linked via their I/O ports to a system CPU and its associated RAM and ROM. The CPU 48 is operatively connected to a multiplier wheel 52 via the wheel driver board 54.

It is contemplated that the system CPU may store an outcome accumulator value associated with each gaming machine; however, each gaming machine could be equipped with its own memory device. Nevertheless, the CPU 48 and wheel driver board will be programmed and adapted to carry out the steps implicit in the foregoing methods for participants playing at the plurality of gaming machine 50.

The dual wagering game 10 utilizing the features previously discussed enhances player interest in solitary-type wagering activities, such a slot machine play, by incorporating aspects of group participation for added excitement and enhanced incentives of play.

It will be understood by those of ordinary skill in the art that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described my invention, I claim:

1. A dual wagering game method comprising:

recognizing a game terminating event;

making a first wager on an outcome of a first game component;

recognizing an initial value zero for an outcome accumulator value of a second game component;

making a first wager on an outcome of said second game component;

determining the outcome of said second game component, the determination of the outcome of the second game component being independent of the outcome of the first game component;

determining the value of the outcome of said second game component;

adding the value of the outcome of said second game component to said outcome accumulator value of said second game component;

determining the outcome of said first game component, the determination of the outcome of the first game component being independent of the outcome of the second game component;

determining the value of the outcome of said first game component; and realizing a payoff equal to said value of the outcome of said first game component multiplied by said outcome accumulator value of said second game component upon occurrence of said game terminating event.

2. The dual wagering game method for a participant as set forth in claim 1, said second game component being repeatable and the method further comprising:

making a subsequent wager on the outcome of said second game component;

determining the outcome of said second game component, the determination of the outcome of the second game component being independent of the outcome of the first game component;

determining the value of the outcome of said second game component;

adding the value of the outcome of said second game component to said outcome accumulator value of said second game component; and repeating the foregoing steps until occurrence of said game terminating event.

3. The dual wagering game method for a participant as set forth in claim 2 further comprising making a subsequent wager on said first game component for each subsequent wager on said second game component.

4. The dual wagering game method for a participant as set forth in claim 2, prior to said step of making a subsequent wager on the outcome of said second game component, the method further comprising deciding whether to make a subsequent wager on the outcome of said second game component.

5. The dual wagering game method for a participant as set forth in claim 1 wherein said game terminating event is selected from the group consisting of a preselected time interval known to the participant, a preselected time interval unknown to the participant, a randomly generated time interval known to the participant, a randomly generated time interval unknown to the participant, a preselected number of completions of said second game component known to the participant, a preselected number of completions of said second game component unknown to the participant, a randomly generated number of completions of said second game component known to the participant, a randomly generated number of completions of said second game component unknown to the participant, occurrence of a preselected independent event known to occur after commencement of said dual wagering game and also known to the participant, and occurrence of a preselected independent event known to occur after commencement of said dual wagering game but unknown to the participant.

6. The dual wagering game method for a participant as set forth in claim 1, wherein said second game component comprises a game of chance utilizing gaming equipment selected from the group consisting of dice, cards, random number generators, wheels, revolving reels, gaming machines, coin flips, races, athletic events, and events having independent chance outcomes.

7. The dual wagering game method for a participant as set forth in claim 6, said second game component being a wheel of chance.

8. The dual wagering game method for a participant as set forth in claim 1, said second game component being non-repeatable.

9. The dual wagering game method for a participant as set forth in claim 1 wherein said first game component comprises a game of chance utilizing gaming equipment selected from the group consisting of dice, cards, random number generators, wheels, revolving reels, gaming machines, coin flips, races, athletic events, and events having independent chance outcomes.

10. A dual wagering game method comprising:

establishing a game terminating event;

permitting each of one or more game participants to place a first wager on an outcome of a first game component common to all game participants;

storing an initial value zero for an outcome accumulator value of a second game component for each game participant, said second game component being unique to each game participant;

permitting each game participant to place a first wager on an outcome of said second game component;

determining a value to the outcome of said second game component for each participant, the determination of the outcome of the second game component being independent of the outcome of the first game component;

summing the value of the outcome of said second game component to said outcome accumulator value of said second game component for each participant;

determining a value to the outcome of said first game component, the determination of the outcome of the first game component being independent of the outcomes of the second game components for each participant; and paying a payoff to each game participant equal to said value of the outcome of said first game component multiplied by said outcome accumulator value of said second game component of each game participant upon occurrence of said game terminating event.

11. The dual wagering game method for one or more participants as set forth in claim 10, said second game component being repeatable and the method further comprising:

permitting each game participant to selectively place a subsequent wager on the outcome of a replay of said second game component;

displaying to each game participant the outcome of that participant's second game component;

registering a value to the outcome of said second game component for each participant;

summing the value of the outcome of said second game component to said outcome accumulator value of said second game component for each participant; and allowing each game participant to repeat the foregoing steps until occurrence of said game terminating event.

12. The dual wagering game method for one or more participants as set forth in claim 11 further comprising receiving from each game participant a subsequent wager on said first game component for each subsequent wager on said second game component.

13. The dual wagering game method for one or more participants as set forth in claim 11, prior to said step of permitting a subsequent wager on the outcome of a replay of said second game component, the method further comprising offering each game participant an option to make a subsequent wager on the outcome of a replay of said second game component or to wait until the occurrence of said game terminating event.

14. The dual wagering game method for one or more participants as set forth in claim 10 wherein said game terminating event is selected from the group consisting of a preselected time interval known to the participant, a preselected time interval unknown to the participant, a randomly generated time interval known to the participant, a randomly generated time interval unknown to the participant, a preselected number of completions of said second game component known to the participant, a preselected number of completions of said second game component unknown to the participant, a randomly generated number of completions of said second game component known to the participant, a randomly generated number of completions of said second game component unknown to the participant, occurrence of a preselected independent event known to occur after commencement of said dual wagering game and also known to the participant, and occurrence of a preselected independent event known to occur after commencement of said dual wagering game but unknown to the participant.

15. The dual wagering game method for one or more participants as set forth in claim 10 wherein said second game component comprises a game of chance utilizing gaming equipment selected from the group consisting of dice, cards, random number generators, wheels, revolving reels, gaming machines, coin flips, races, athletic events, and events having independent chance outcomes.

16. The dual wagering game method for one more participants as set forth in claim 15, said second game component being a wheel of chance.

17. The dual wagering game method for one or more participants as set forth in claim 10, said second game component being nonrepeatable.

18. The dual wagering game method for one or more participants as set forth in claim 10, wherein said first game component comprises a game of chance utilizing gaming equipment selected from the group consisting of dice, cards, random number generators, wheels, revolving reels, gaming machines, coin flips, races, athletic events, and events having independent chance outcomes.

* * * * *